H. J. KENNEY.
TROLLING SPINNER.
APPLICATION FILED MAR. 30, 1920.
1,393,790. Patented Oct. 18, 1921.
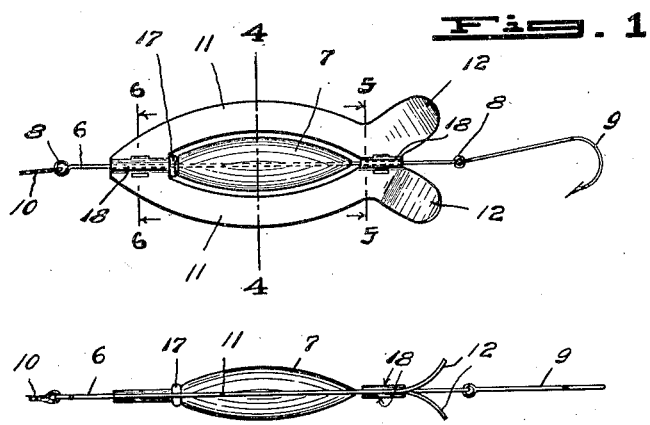
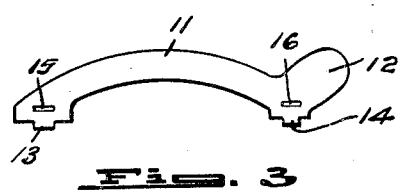
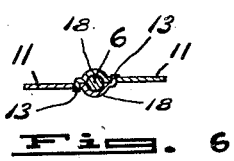
Inventor
Harry J. Kenney
By His Attorney
Fred C. Matheny

UNITED STATES PATENT OFFICE.

HARRY J. KENNEY, OF SEATTLE, WASHINGTON.

TROLLING-SPINNER.

1,393,790. Specification of Letters Patent. Patented Oct. 18, 1921.

Application filed March 30, 1920. Serial No. 370,002.

*To all whom it may concern:*

Be it known that I, HARRY J. KENNEY, a citizen of the United States, residing at Seattle, in the county of King and State of Washington, have invented certain new and useful Improvements in Trolling-Spinners, of which the following is a specification.

My invention relates to improvements in fishing spinners or spinner spoons of the class that are used in trolling for game fish either in fresh or salt water and the object of my improvement is to provide a spinner that is particularly alluring and that will be taken readily by the fish.

Another object is to provide a perfectly balanced spinner having a weight or sinker incorporated into the construction thereof, the said weight being mounted within the center of the spinner and on the longitudinal axis thereof and the spinner being arranged to revolve around the weight.

A further and more specific object is to provide a two part spinner by which a perfectly balanced structure is secured and by which the manufacture and assembling of the various parts are facilitated.

The invention consists in the novel construction, adaptation and combination of parts of a trolling spinner as will be more clearly hereinafter described and claimed.

In the accompanying drawings Figure 1 is a plan view of a spinner constructed in accordance with my invention; Fig. 2 is a view in side elevation of the same; Fig. 3 is a plan view showing one of the blanks of metal from which the spinner is made; Figs. 4 and 5 are sectional views on broken lines 4, 4 and 5, 5 of Fig. 1 respectively, and Fig. 6 is an enlarged sectional view on broken line 6, 6 of Fig. 1.

Referring to the drawings, throughout which like reference numerals designate like parts, the numeral 6 designates a straight wire or shank whereon is secured a relatively long symmetrically shaped weight 7 preferably of lead or similar heavy material.

The shank 6 projects in both directions from the weight 7 and is provided at each end with an eyelet 8, one of which may have hooks or a hook 9 secured thereto and the other of which may be connected with the end of a line or leader 10.

The spinner proper is preferably made up of two separate pieces of metal of duplicate construction each of which pieces comprises a body portion 11 that is flat when viewed from the edge as in Fig. 2 and that is curved when viewed in plan as in Figs. 1 and 3, the curvature of the outer edge of such body portion 11 being easy and gradual so that when two of the pieces are placed together as hereinafter explained a relatively long oval shaped spinner is formed.

The body portions 11 are each provided at the rear end with a rearwardly and outwardly projecting blade 12 that is bent as shown in Figs. 2 and 5 so that relative movement between the spinner and the water in which it is submerged will impart a whirling motion to the spinner.

The body portions 11 are provided on one edge and adjacent the front and rear ends respectively with lugs 13 and 14 that are bent at right angles to the plane of the spinner and such body portions are further each provided adjacent the lugs with slots 15 and 16 through which the lugs on the opposite half of the spinner may be inserted when the device is assembled. Fig. 3 shows one of the pieces from which the spinner is made after it is blanked out and before it is bent.

Those portions of the spinner between the lug 13 and slot 15 and between the lug 14 and slot 16 are bent as at 18 in such a manner that when two of the parts are assembled bearings for the ends of the shank 6 will be formed.

The sections from which the spinner is made are preferably stamped out of metal and bent to the correct shape so that, in assembling, two of such sections are placed over a wire shank 6, as shown, with the lugs 13 and 14 projecting through the slots 15 and 16 and the ends of the lugs are riveted or upset as shown in Fig. 6 to secure such two sections together.

An anti-friction bearing 17 which may be an ordinary glass bead will preferably be provided at the forward end of the weight 7.

The spinner is necessarily of bright and highly polished metal that will reflect light and the weight 7 is of lead, and of a dark color thus making a fish lure in which a bright spinner revolves around a dark center which lure has proven very effective in attracting game fish.

Constructing the spinner in two parts as described makes the same easy and convenient to assemble and results in a perfectly balanced device.

The lead weight is preferably molded on the shank 6 and may if necessary be turned to a perfect balance after it is molded. The weight 7 serves as a sinker to hold the spinner down in the water when in use.

From the foregoing description taken in connection with the accompanying drawings the advantages of the construction and of the method of operation of the invention will be readily apparent to those skilled in the art to which the invention relates and while I have described the principle of operation of the invention together with the device which I now consider to be the best embodiment thereof, I desire to have it understood that the spinner shown is merely illustrative and that such changes may be made as are within the scope of the following claims.

What I claim is:—

1. A trolling spinner comprising a symmetrically formed spinner member having a substantially flat body and having a relatively long centrally located oval shaped recess, blades on the rear end of said spinner member and curved in opposite direction from the plane of the body of said spinner member, a straight shank extending lengthwise axially of said spinner member, and a relatively long oval shaped weight secured on said shank and arranged symmetrically within the recess in the body of said spinner member.

2. A trolling spinner comprising a relatively long oval shaped sinker of non-light reflecting material, an axially arranged shank projecting outwardly from each end of said sinker, a substantially plane highly polished light reflecting spinner blade journaled on said shanks and having a relatively long oval shaped central opening within which said sinker is disposed, and integral curved vanes on said spinner blade in rear of the rear end of said weight for imparting a rotary motion to said spinner blade.

3. A trolling spinner comprising a spinner member formed of two symmetrically shaped plates of oval configuration that are cut away to leave an opening in the center of the spinner member, the said plates being arranged to overlap at each end of said opening and being curved to form axially arranged bearings and each of said plates having slots and having studs formed at the location of the overlapping portions, the studs in one plate being adapted to project through the slots in the other plate, a straight shank journaled within said bearings and extending axially through said spinner and a symmetrical weight secured to said shank and disposed within the central opening of said spinner.

4. A fish lure of the class described comprising a spinner member, and a sinker weight inclosed by the sides and ends of said spinner member and arranged symmetrically and in balanced relation with respect to said spinner member.

5. A trolling spinner comprising a rotatable member having a central opening and a sinker weight supported centrally of the rotatable member within the opening and spaced from the walls thereof to cause the spinner to travel beneath the surface of the water.

6. A trolling spinner comprising a rotatable member having a central opening and a sinker weight of the same contour as the opening, and of less diameter than the opening supported centrally thereof to cause the spinner to travel beneath the surface of the water.

Signed at Seattle, Washington, this 20th day of March 1920.

HARRY J. KENNEY.